Patented Oct. 16, 1945

2,386,952

UNITED STATES PATENT OFFICE 2,386,952

CUTTING OILS

Everett C. Hughes, Cleveland Heights, Ohio, assignor to The Standard Oil Company, Cleveland, Ohio, a corporation of Ohio No Drawing. Application October 22, 1941,
Serial No. 416,084

12 Claims. (Cl. 252—48)

This invention relates to cutting oils, and it is among the objects of the invention to provide products of excellent efficiency, and which may be free from the usual corrosive property if desired. Other objects and advantages will appear as the description proceeds.

To the accomplishment of the foregoing and related ends, the invention, then, comprises the features hereinafter fully described, and particularly pointed out in the claims, the following description setting forth in detail certain illustrative embodiments of the invention, these being indicative however, of but a few of the various ways in which the principle of the invention may be employed.

The invention will be readily understood by reference to an illustrative example: A paraffin base oil of Saybolt viscosity 100 sec. at 100° F. is heated with 3 per cent of phosphorus pentasulphide for one hour at 330° F. The phosphorus pentasulphide is substantially combined, but in order to clear up residual traces thereof, 1 per cent of corn oil is then added and the temperature is maintained for a half hour. Then the product is treated with 2 per cent of clay. The resulting oil is clear and non-corrosive when used in ordinary temperatures.

Instead of corn oil, other reactive fatty oil or wax, i. e. a fatty acid ester, may be used to clear up residual phosphorus pentasulphide, and unsaturated fatty oils or waxes are preferred. Examples are cottonseed oil, soya bean oil, degras, lard oil, tallow oil, sperm oil, etc.

The amounts of such fats or waxes added may be up to 15 per cent. In such procedure, it will be noticed that the mineral oil is given an opportunity to react as completely as possible with the phosphorus pentasulphide, and then it is the residual traces thereof which are cleaned up by the addition of the ester. If the ester treatment be admitted, the cutting oil product is slightly corrosive. For some purposes this is however immaterial, and the further refinements of the invention are concerned more particularly with the preparation of extra quality products.

It is usually desirable to carry on the cooking operation under an atmosphere of an inert gas, such as carbon dioxide or nitrogen.

The mineral oil base may be of usual petroleum stocks as employed for lubricating oils, and the viscosity may depend somewhat upon the particular kind of machine tool work with which the cutting oil is to be applied. Generally, viscosities of 90 to 200 sec. at 100° F. are desirable. Amounts of phosphorus pentasulphide may be ½ to 5 per cent, preferably 2 to 3 per cent, by weight. And, it is desirable to introduce the phosphorus pentasulphide in divided portions or increments up to the total amount it is decided to use. Heating times are in general 1 up to 8 hours. After the cooking process, on cooling the product any solids present may be separated by filtration or by settling. Desirably, the oil is finally subjected to treatment with clay, or with sulphuric acid, or with both.

Other modes of applying the principle of the invention may be employed, change being made as regards the details described, provided the features stated in any of the following claims, or the equivalent of such, be employed.

I therefore particularly point out and distinctly claim as my invention:

1. A process of making a cutting oil, which comprises reacting phosphorus pentasulphide with a mineral oil in atmosphere of inert gas, at a temperature of 200–450° F. for at least about an hour, then incorporating a small amount of corn oil to clear up residual phosphorus pentasulphide and subjecting to reaction temperature.

2. A process of making a cutting oil, which comprises reacting phosphorus pentasulphide with a mineral oil in atmosphere of inert gas, at a temperature of 200–450° F. for at least about an hour, then incorporating a small amount of soya bean oil to clear up residual phosphorus pentasulphide and subjecting to reaction temperature.

3. A process of making a cutting oil, which comprises reacting phosphorus pentasulphide with a mineral oil in atmosphere of inert gas, at a temperature of 200–450° F. for at least about an hour, then incorporating a small amount of degras to clear up residual phosphorus pentasulphide and subjecting to reaction temperature.

4. A process of making a cutting oil, which comprises reacting phosphorus pentasulphide with a mineral oil in atmosphere of inert gas, at a temperature of 200–450° F. for at least about an hour, then incorporating a long chain fatty acid ester to clear up residual phosphorus pentasulphide and subjecting to reaction temperature.

5. A process of making a cutting oil, which comprises reacting phosphorus pentasulphide with a mineral oil at 200–450° F. for at least about an hour, then incorporating a long chain fatty acid ester to clear up residual phosphorus pentasulphide and subjecting to reaction temperature.

6. A process of making a cutting oil, which comprises reacting phosphorus pentasulphide with a mineral oil at 200-450° F. for at least about an hour, and then clearing up residual phosphorus pentasulphide by incorporating a small amount of an unsaturated fatty oil and subjecting to similar temperature.

7. A process of making a cutting oil, which comprises reacting phosphorus pentasulphide with a mineral oil at 200-450° F. for at least about an hour, and then clearing up residual phosphorus pentasulphide by incorporating a small amount of an ester wax and subjecting to similar temperature.

8. A cutting oil consisting of the reaction product of phosphorus pentasulphide on a mineral oil and in succession a small amount of corn oil in accordance with the process of claim 1.

9. A cutting oil consisting of the reaction product of phosphorus pentasulphide on a mineral oil and in succession a small amount of soya bean oil in accordance with the process of claim 2.

10. A cutting oil consisting of the reaction product of phosphorus pentasulphide on a mineral oil and in succession a small amount of degras in accordance with the process of claim 3.

11. A cutting oil consisting of the reaction product of phosphorus pentasulphide on a mineral oil and in succession a small amount of a long chain fatty acid ester in accordance with the process of claim 4.

12. A cutting oil consisting of the reaction product of phosphorus pentasulphide on a mineral oil and having residual phosphorus pentasulphide neutralized by further reaction with a long chain fatty acid ester in accordance with the process of claim 5.

EVERETT C. HUGHES.

CERTIFICATE OF CORRECTION.

Patent No. 2,386,952.                       October 16, 1945.

EVERETT C. HUGHES.

It is hereby certified that error appears in the printed specification of the above numbered patent requiring correction as follows: Page 1, first column, line 41, for "admitted" read --omitted--; and that the said Letters Patent should be read with this correction therein that the same may conform to the record of the case in the Patent Office.

Signed and sealed this 5th day of February, A. D. 1946.

Leslie Frazer (Seal)                     First Assistant Commissioner of Patents.

6. A process of making a cutting oil, which comprises reacting phosphorus pentasulphide with a mineral oil at 200–450° F. for at least about an hour, and then clearing up residual phosphorus pentasulphide by incorporating a small amount of an unsaturated fatty oil and subjecting to similar temperature.

7. A process of making a cutting oil, which comprises reacting phosphorus pentasulphide with a mineral oil at 200–450° F. for at least about an hour, and then clearing up residual phosphorus pentasulphide by incorporating a small amount of an ester wax and subjecting to similar temperature.

8. A cutting oil consisting of the reaction product of phosphorus pentasulphide on a mineral oil and in succession a small amount of corn oil in accordance with the process of claim 1.

9. A cutting oil consisting of the reaction product of phosphorus pentasulphide on a mineral oil and in succession a small amount of soya bean oil in accordance with the process of claim 2.

10. A cutting oil consisting of the reaction product of phosphorus pentasulphide on a mineral oil and in succession a small amount of degras in accordance with the process of claim 3.

11. A cutting oil consisting of the reaction product of phosphorus pentasulphide on a mineral oil and in succession a small amount of a long chain fatty acid ester in accordance with the process of claim 4.

12. A cutting oil consisting of the reaction product of phosphorus pentasulphide on a mineral oil and having residual phosphorus pentasulphide neutralized by further reaction with a long chain fatty acid ester in accordance with the process of claim 5.

EVERETT C. HUGHES.

CERTIFICATE OF CORRECTION.

Patent No. 2,386,952.

October 16, 1945.

EVERETT C. HUGHES.

It is hereby certified that error appears in the printed specification of the above numbered patent requiring correction as follows: Page 1, first column, line 41, for "admitted" read --omitted--; and that the said Letters Patent should be read with this correction therein that the same may conform to the record of the case in the Patent Office.

Signed and sealed this 5th day of February, A. D. 1946.

Leslie Frazer (Seal)

First Assistant Commissioner of Patents.